3,499,776
ALKALI METAL BOROSILICATE GLASS COMPOSITIONS CONTAINING ZIRCONIA

Nils Tryggve E. A. Baak, Ridgefield, Conn., and Charles F. Rapp, Toledo, Ohio, assignors to Owens-Illinois, Inc., a corporation of Ohio
Filed July 13, 1966, Ser. No. 564,867
Int. Cl. C03c *3/08, 3/30*
U.S. Cl. 106—54                14 Claims

ABSTRACT OF THE DISCLOSURE

A borosilicate glass composition having high chemical durability, being particularly resistant to attack by alkalis, and which is suitable for use in the pharmaceutical, scientific and biological fields for flasks, beakers, tubing, ampules, antibiotic containers, drug jars, pill bottles, and the like. The glass composition consists essentially of 72–85 mole percent $SiO_2$, 4–12 mole percent $B_2O_3$, 1–6 mole percent $ZrO_2$, and 2.5–7 mole percent $R_2O$ ($Na_2O$ and/or $K_2O$).

---

The present invention relates to novel glass compositions, and more particularly, the instant invention pertains to unique glass compositions possessing high chemical durability and excellent working characteristics. A specific aspect of the subject invention concerns the beneficial effects resulting from the zirconia addition or replacement of a given amount of boron oxide in a silica-boron oxide glass system.

Special glass compositions, especially those compositions possessing high chemical durability and a relatively low to medium thermal coefficient of expansion are acutely needed in the fields of science and commerce. The need for this type of glass compositions is pronounced for the satisfactory fabrication under normal manufacturing conditions of glass items for the pharmaceutical, scientific and biological disciplines. Chemical resistance against water, acids and alkali and the like is of extreme importance in the pharmaceutical industry for ampules, serum vials, transfusion bottles, antibiotic containers, drug jars, pill bottles and the like. The physical and biological sciences with their sensitive reactions also require glassware such as tubes, tubing, beakers, flasks, filters and funnels, that is essentially chemical resistant because trace quantities of glass leachable components may exert a detrimental effect on the sensitive reaction or experiment.

In the past, many experimental attempts have been made to develop glasses which possess high chemical durability and a relatively low to medium thermal coefficient of expansion. The past attempts have generally involved the modification of existing prior art borosilicate glasses by altering the amount of silica and alkali contents in said glasses. While the thus modified prior art borosilicate glasses possess sufficient chemical durability against acids and water, they generally possess poor chemical resistance against alkali. Glass technologists feel that the chemical attack of alkali on glass is apparently somewhat different from that of acid and water. If a glass is leached with acid or water, the alkali in the surface is removed and a layer rich in silica results. The thus-formed surface layer is then quite resistant to further attacks by water or acids. A different reaction is believed to occur when glass is subjected to attack by alkali as the silica goes into solution and preleaching of the glass surface with alkali does not produce any substantial change in the chemical durability. Another serious problem with the modified prior art borosilicate glasses is its vapor loss due to the formation of highly volatile sodium borate. This loss may often cause cordiness in the glass and a weakness in the final glass product. Yet another serious problem which often arises is the tendency for these glasses to separate into liquid phases which phase separation can cause a weakening of the glass, a lowering of the chemical durability and an increase of the thermal expansion. Other ill-fated efforts tend to produce a high liquidus temperature with possible subsequent devitrification during the formation operation which may restrict the type of forming and molding operations that may be employed for these glasses.

It will be appreciated by those knowledged in the subject art that if glass compositions are inventively formulated with high chemical durability, such compositions would represent a useful contribution to the art. It will be further appreciated by those versed in the art that if glass compositions are compounded with high chemical durability and excellent working properties for conventional operating conditions, such glass would represent a useful advancement to the art. Likewise, it will be appreciated by those skilled in the art that if glass can be formulated with a relatively low to medium coefficient of thermal expansion possessing an accompanying improvement in the chemical durability against alkali and if the liquidus can be suppressed to the point where the glass can be fabricated by the usual blowing, drawing, casting and pressing procedures, said glasses would have a definite commercial value and a positive use for science and industry.

Accordingly, it is an object of the present invention to provide new and improved glass compositions.

Another object of the present invention is to provide novel glass compositions that possess desirable chemical and physical properties.

Still another object of this invention is to provide glass compositions possessing improved and good chemical durability against alkali.

Yet another object of this invention is to provide glass compositions possessing a relatively low to medium thermal coefficient of expansion.

Yet a further object of this invention is to provide glass compositions with a desirable liquidus to facilitate fabrication of glassware by conventional manufacturing procedures.

Still a further object of this invention is to provide novel glass compositions that possess desirable viscosities at their respective liquidus temperature and are, therefore, capable of being formed by conventional techniques.

Yet a further object of the present invention is to provide a glass composition containing zirconia that has excellent chemical durability and a suppressed liquidus temperature to give resultant glasses that have excellent working properties by conventional techniques without devitrification.

Yet a further object of the invention is to provide homogeneous glass compositions that are essentially free from cordiness.

Yet a further object of this invention is to effect a novel glass composition that contains an intimate blend of boron and zirconia glass formers.

Still a further object of the subject invention is to provide glass compositions that overcome the problems which have been encountered by the prior art glasses.

The specific nature of this invention as well as other objects and advantages will become apparent to those versed in the subject art from the following detailed description and now preferred embodiments of the invention taken in conjunction with the accompanying drawings wherein.

Figure 1:
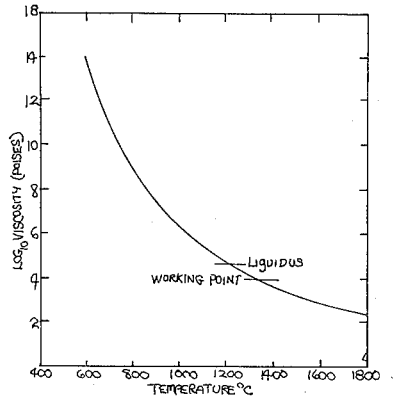
FIGURE 1 shows the viscosity curve for a subject glass wherein said glass consists of 81.2 mole percent $SiO_2$, 9.34 mole percent $B_2O_3$, 2.1 mole percent $ZrO_2$, 3.7 mole percent $Na_2O$, 1.6 mole percent $Al_2O_3$, and 2.1 mole percent BaO.
Figure 2:
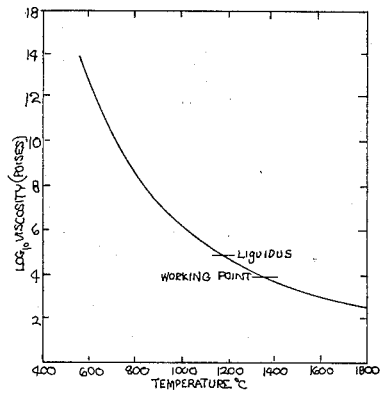
FIGURE 2 shows the viscosity curve for a subject glass wherein said glass consists of 83.0 mole percent $SiO_2$, 9.0 mole percent $B_2O_3$, 2.0 mole percent $ZrO_2$, 4.5 mole percent $Na_2O$, and 1.5 mole percent $Al_2O_3$.
Figure 4:
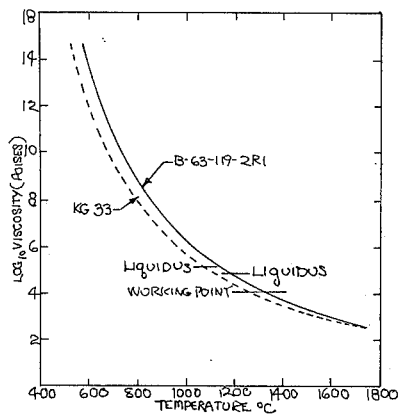
FIGURE 4 shows the viscosity curve for a subject glass containing 83.0 mole percent $SiO_2$, 9.0 mole percent $B_2O_3$, 3.5 mole percent $ZrO_2$, and 4.5 mole percent $Na_2O$.

It has now been found that the objects, features and aspects of this invention can be attained by the addition of select amounts of zirconia to a glass composition wherein said zirconia is in intimate balance with a given amount of the boric oxide contained in said glass composition. It has been further found that glasses with high chemical durability against water, acids and alkali and with depressed liquidus can be uniquely formulated by inventively adding zirconia to the subject glasses. The results obtained by the employment of zirconia and its substitution for part of the boric oxide content appear to be unexpected, for zirconia is difficult to keep in solution because of its insolubility and because it thereby generally gives a high liquidus temperature with subsequent devitrification during the forming operation which severely restricts the type of forming for these glasses. In the present glasses, it has been unexpectedly found that the liquidus has been depressed to the point where the present glasses possess good working properties for any and all conventional means. Also the average thermal coefficient of expansion for the instant glasses is in the low to medium range, generally about 30 to $45 \times 10^{-7}/°$ C. (0–300° C.) with the now preferred range of about 30 to about 35 which range indicates a good thermal shock resistance and that the glass composition is, therefore, suitable for a general line of industrial and scientific ware. Also, due to the smaller amounts of $B_2O_3$, the present glasses are essentially free from cordiness and vapor losses attributed to boric oxide. By limiting the quantity or intimately balancing the presence of boric oxide and by the addition of zirconia to the subject glass compositions, a clear, homogeneous glass results, with good chemical durability against attack by alkali.

The now desired glasses of the present invention may conveniently be divided into two groups, that is those glasses containing less than 5 mole percent boric oxide and glasses containing more than 5 mole percent boric oxide. In addition, the subject glasses will generally contain silica, alumina, zirconia, alkali oxides and alkaline earth oxides. The glasses may also contain other oxides such as tin, and titanium. Of course, select colorants may also be added to the subject glasses for the desired esthetic effects.

The subject glasses of the present invention are based on compositions containing about 72 to 85 mole percent $SiO_2$, about 4 to 12 mole percent $B_2O_3$, about 1 to 6 mole percent $ZrO_2$, about 2.5 to 7 mole percent $R_2O$, wherein R is a member selected from the group consisting of sodium and potassium and mixtures thereof, about 0 to 4 mole percent $Al_2O_3$, about 0 to 3 mole percent $TiO_2$, and about 0 to 0.5 mole percent of a refining agent such as $Sb_2O_3$. The instant glass based on the above composition usually contains about 72 to 85 mole percent $SiO_2$, about 1 to 6 mole percent $ZrO_2$, about 2.5 to 7 mole percent $Na_2O$, $K_2O$ or mixtures thereof, about 1 to 7.5 mole percent CaO, BaO, SrO, or MgO or mixtures thereof, about 0 to 4 mole percent $Al_2O_3$, about 0 to 0.5 mole percent $Sb_2O_3$, about 0 to 3 mole percent $TiO_2$, and from about 5 to 12 mole percent $B_2O_3$. Also the present invention includes glass compositions comprising about 75 to 85 mole percent $SiO_2$, about 1 up to about 5 mole percent $B_2O_3$, about 1 to about 5 mole percent $ZrO_2$, about 1 to 6 mole percent sodium or potassium oxide or mixtures thereof, about 6 to 15 mole percent CaO, MgO, SrO, or BaO, or mixtures thereof, about 0 to 3 mole percent $Al_2O_3$, about 0 to 2 mole percent ZnO, and about 0 to 1 mole percent $Li_2O$.

Various glass compositions with excellent chemical durability within the mode and manner of the present invention are glasses comprising from about 80 to 85 mole percent $SiO_2$, about 6 to 10 mole percent $B_2O_3$, about 1.5 to 5 mole percent $ZrO_2$, about 2.5 to 5 mole percent $Na_2O$, and about 1.5 to 4 mole percent $Al_2O_3$; a glass composition comprising 80 to 85 mole percent $SiO_2$, 6 to 10 mole percent $B_2O_3$, 1.5 to 6 mole percent $ZrO_2$, and 2.5 to 6 mole percent $Na_2O$; a glass composition comprising 80 to 85 mole percent $SiO_2$, 6 to 10 mole percent $B_2O_3$, 1.5 to 5 mole percent $ZrO_2$, 2.5 to 5 mole percent $Na_2O$, 1.5 to 4 mole percent $Al_2O_3$, and 1 to 6 mole percent CaO; a glass composition comprising 80 to 85 mole percent $SiO_2$, 6 to 10 mole percent $B_2O_3$, 1.5 to 5 mole percent $ZrO_2$, 2.5 to 5 mole percent $Na_2O$, 1.5 to 4 mole percent $Al_2O_3$, 1 to 6 mole percent CaO, and 1 to 6 mole percent MgO; a glass composition comprising 80 to 85 mole percent $SiO_2$, 6 to 10 mole percent $B_2O_3$, 1.5 to 5 mole percent $ZrO_2$, 2.5 to 5 mole percent $Na_2O$, 1 to 4 mole percent $Al_2O_3$, 1 to 6 mole percent CaO, and 1 to 6 mole percent BaO; a glass composition comprising 75 to 80 mole percent $SiO_2$, 6 to 10 mole percent $B_2O_3$, 1.5 to 5 mole percent $ZrO_2$, 2 to 5 mole percent $Na_2O$, 1 to 4 mole percent $Al_2O_3$, and 1 to 6 mole percent BaO; a glass composition comprising 80 to 85 mole percent $SiO_2$, 6 to 10 mole percent $B_2O_3$, 1.5 to 5 mole percent $ZrO_2$, 2 to 3 mole percent $Na_2O$, 1 to 4 mole percent $Al_2O_3$, 1 to 6 mole percent CaO, and 1 to 6 mole percent BaO; a glass composition comprising 80 to 85 mole percent $SiO_2$, 0 to 3 mole percent $Al_2O_3$, 1 to 5 mole percent $ZrO_2$, 1 to 5 mole percent $B_2O_3$, 0 to 6 mole percent $Na_2O$ or $K_2O$ or combinations thereof and wherein $Na_2O + K_2O$ is at least 2, 0 to 15 mole percent CaO, BaO, SrO or MgO, and wherein the total $CaO + MgO + BaO + SrO$ is at least 6 mole percent and not greater than 15 mole percent; a glass comprising 80 to 85 mole percent $SiO_2$, 1 to 5 mole percent $ZrO_2$, 1 to 5 mole percent $B_2O_3$, 2 to 5 mole percent $Na_2O$ or $K_2O$, and 6 to 7.5 mole percent CaO, and 6 to 7.5 mole percent MgO; a glass composition comprising 80 to 85 mole percent $SiO_2$, 1 to 5 mole percent $ZrO_2$, 1 to 5 mole percent $B_2O_3$, 1 to 6 mole percent $Na_2O$ or $K_2O$, 1 to 6 mole percent CaO or MgO, or BaO, and wherein the total $CaO + BaO + MgO$ is at least 6 to 12 mole percent, and 1 to 2 mole percent $Li_2O$; and a glass composition comprising 80 to 85 mole percent $SiO_2$, 1 to 5 mole percent $ZrO_2$, 1 to 5 mole percent $B_2O_3$, 2 to 6 mole percent $Na_2O$, or $K_2O$, 6 to 12 mole percent CaO, MgO, SrO, or BaO, 1 to 2 mole percent $Al_2O_3$; and a glass composition comprising 75 to 85 mole percent $SiO_2$, 1 to 5 mole percent $ZrO_2$, 1 to 5 mole percent $B_2O_3$, 2 to 6 mole percent $Na_2O$ or $K_2O$ or mixtures thereof, 6 to 12 mole percent CaO, or MgO, or SrO, or mixtures thereof.

In preparing the glasses of the subject invention, the batch ingredients are intimately mixed and heated to such temperatures so that all substances are present in the liquid state, thereby enabling the formation of a homogeneous glass from the melt. The batch ingredients were mixed well by hand or in a commercially-available V-blender. Melting was performed in a 90% platinum-10% rhodium crucible in an electric furnace at 1500 to 1600° C. in an air atmosphere. Of course, other suitable functionally equivalent melting means obvious to those skilled in the present art may be employed herein to obtain the inventive glass compositions. The melts were usually crushed and remelted at 1500 to 1600° C. for 16 to 24 hours to insure homogeneity.

The batch materials employed for preparing the glasses of the invention were of high purity and were selected from the following: $SiO_2$ Kona Quartz, $Al_2O_3$ Alcoa A-14, $ZrSiO_4$ Florida Zircon (milled—200 mesh), $B_2O_3$ Baker Purified Reagent, and the following Fisher Certified Reagents and Baker Analyzed Reagents: $ZrO_2$, $Na_2CO_3$, $K_2CO_3$, $Li_2CO_3$, $MgCO_3$, $CaCO_3$, $SrCO_3$, $BaCO_3$, $ZnCO_3$, $TiO_2$, and $Sb_2O_5$.

Batch constituents representative for preparing the novel glasses of the instant invention are set forth in Table I, but, of course, other batch constituents for producing the unique glasses of the present invention may be obtained by those versed in the subject art by substituting the desired ingredients within the spirit of the invention.

TABLE I.—BATCH CONSTITUENTS, GRAMS

| Ingredients | Example 1 | Example 2 | Example 3 | Example 4 |
|---|---|---|---|---|
| $SiO_2$ (Kona quartz) | 396.30 | 750.00 | 788.61 | 1,090.85 |
| $B_2O_3$ (anhydrous) | 49.80 | 100.00 | 99.10 | 106.62 |
| $ZrO_2$ | 19.59 | 40.00 | 68.19 | 134.75 |
| $Na_2CO_3$ | 37.90 | 59.86 | 75.41 | 115.90 |
| $Al_2O_3$ (Alcoa A-14) | 12.15 | 25.00 | | |
| $BaCO_3$ | | 64.35 | | |

The above examples were melted for 16 to 24 hours at 1500 to 1600° C. in a platinum-rhodium crucible in an air atmosphere. The mole percent for the glass of Table I, listed as Examples 1 to 4, is set forth in Table II, as Examples 5 to 8 respectively.

TABLE II.—GLASS COMPOSITION, MOLE PERCENT

| | Example 5 | Example 6 | Example 7 | Example 8 |
|---|---|---|---|---|
| Ingredients: | | | | |
| $SiO_2$ | 83.0 | 81.2 | 83.0 | 83.0 |
| $B_2O_3$ | 9.0 | 9.4 | 9.0 | 7.0 |
| $ZrO_2$ | 2.0 | 2.1 | 3.5 | 5.0 |
| $Na_2O$ | 4.5 | 3.7 | 4.5 | 5.0 |
| $Al_2O_3$ | 1.5 | 1.6 | | |
| $BaO$ | | 2.1 | | |

Figure 3:
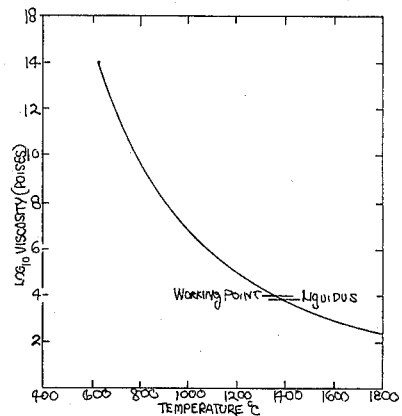
FIGURE 3 shows the viscosity curve for a subject glass wherein the glass contains 83.0 mole percent $SiO_2$, 7.0 mole percent $B_2O_3$, 5.0 mole percent $ZrO_2$, and 5.0 mole percent $Na_2O$.

The tables set forth immediately below further define and disclose the subject glass compositions as made according to the mode and manner of the instant invention. The tables list the liquidus and the coefficient of expansion for representative glasses. As is evident when the zirconia concentration tends to exceed 5 mole percent, the liquidus tends to rise above the working point of $\log_{10}$ viscosity equal 4.0. See also in this respect FIGURE 3.

TABLE III.—GLASS COMPOSITION, MOLE PERCENT

| | Example 9A | Example 9B | Example 9C | Example 9D |
|---|---|---|---|---|
| Ingredients: | | | | |
| $SiO_2$ | 83 | 81.16 | 83.0 | 83.0 |
| $ZrO_2$ | 2 | 2.11 | 3.5 | 5.0 |
| $Al_2O_3$ | 1.5 | 1.59 | | |
| $Na_2O$ | 4.5 | 3.67 | 4.5 | 5.0 |
| $BaO$ | | 2.12 | | |
| $B_2O_3$ | 9 | 9.34 | 9.0 | 7.6 |
| $\alpha \times 10^7$ | 33.7 | 34.2 | 31.8 | 32.5 |
| Liquidus, °C | 1,179 | 1,210 | 1,185 | 1,380 |

Table IV, immediately below, discloses various glass compositions made in accordance with the present invention. The table discloses various oxide compositions in the subject glasses.

TABLE IV.—MOLE PERCENT

| Example No. | $\alpha \times 10^7$ | $SiO_2$ | $B_2O_3$ | $ZrO_2$ | $Na_2O$ | $Al_2O_3$ | $CaO$ | $BaO$ | $MgO$ | $Sb_2O_3$ | $TiO_2$ | $SrO$ | $K_2O$ | $Li_2O$ | $ZnO$ |
|---|---|---|---|---|---|---|---|---|---|---|---|---|---|---|---|
| 10 | 30.6 | 83.0 | 6.0 | 5.0 | 4.5 | 1.5 | | | | | | | | | |
| 11 | 33.0 | 83.0 | 6.0 | 2.5 | 4.5 | 4.0 | | | | | | | | | |
| 12 | 34.1 | 83.0 | 9.0 | 2.0 | 4.5 | 1.5 | | | | | | | | | |
| 13 | 26.1 | 83.0 | 9.0 | 2.0 | 2.5 | 3.5 | | | | | | | | | |
| 14 | 32.6 | 81.16 | 9.34 | 2.11 | 3.67 | 1.59 | | 2.12 | | | | | | | |
| 15 | 30.8 | 83.0 | 9.0 | 3.5 | 4.5 | | | | | | | | | | |
| 16 | 37.3 | 83.0 | 6.0 | 5.0 | 6.0 | | | | | | | | | | |
| 17 | | 76.5 | 9.0 | 4.0 | 2.5 | 2.0 | | 6.0 | | | | | | | |
| 18 | | 76.5 | 9.0 | 4.0 | 2.5 | 2.0 | 2.0 | 4.0 | | | | | | | |
| 19 | | 83.0 | 6.0 | 5.0 | 4.0 | | 2.0 | | | | | | | | |
| 20 | | 83.0 | 6.0 | 5.0 | 4.0 | | | | 2.0 | | | | | | |
| 21 | 35.8 | 82.0 | 6.0 | 6.0 | 6.0 | | | | | | | | | | |
| 22 | 32.6 | 83.0 | 7.0 | 5.0 | 5.0 | | | | | | | | | | |
| 23 | 32.1 | 83.0 | 6.0 | 5.0 | 5.0 | 1.0 | | | | | | | | | |
| 24 | 32.7 | 83.0 | 8.0 | 4.0 | 4.5 | 0.5 | | | | | | | | | |
| 25 | 30.8 | 83.0 | 7.5 | 3.5 | 4.5 | 1.5 | | | | | | | | | |
| 26 | 35.3 | 81.5 | 7.5 | 3.5 | 4.5 | 1.5 | 1.5 | | | | | | | | |
| 27 | 34.2 | 83.0 | 6.0 | 3.5 | 4.5 | 1.5 | 1.5 | | | | | | | | |
| 28 | 31.0 | 81.5 | 6.0 | 5.0 | 4.5 | 1.5 | 1.5 | | | | | | | | |
| 29 | 34.6 | 80.0 | 6.0 | 3.5 | 4.0 | 1.5 | 2.5 | | 2.5 | | | | | | |
| 30 | 38.7 | 78.0 | 6.0 | 3.5 | 4.0 | 1.0 | 2.5 | 2.5 | 2.5 | | | | | | |
| 31 | | 72.9 | 12.15 | 5.0 | 5.0 | 2.7 | | | | 2.25 | | | | | |
| 32 | | 83.0 | 4.0 | 5.0 | 6.0 | 2.0 | | | | | | | | | |
| 33 | 43.3 | 80.0 | 3.0 | 5.0 | 5.0 | | 7.0 | | | | | | | | |
| 34 | 38.5 | 80.0 | 3.0 | 5.0 | 4.0 | | 6.0 | | 2.0 | | | | | | |
| 35 | 38.6 | 82.0 | 3.0 | 3.0 | 4.0 | | 6.0 | | 2.0 | | | | | | |
| 36 | 38.5 | 80.0 | 1.0 | 5.0 | 2.0 | | 5.0 | | 5.0 | | | 2.0 | | | |
| 37 | 39.7 | 80.0 | 1.0 | 5.0 | 2.0 | | 4.5 | | 4.5 | | | 2.0 | | 1.0 | |
| 38 | 39.6 | 80.0 | 1.0 | 5.0 | 2.0 | | 3.5 | 1.0 | 3.5 | | | 2.0 | | 1.0 | 1.0 |
| 39 | | 80.0 | 3.0 | 5.0 | 2.0 | | 2.5 | 2.0 | 2.5 | | | 2.0 | | 1.0 | |
| 40 | | 80.0 | 3.0 | 5.0 | 2.0 | | 0.5 | 1.0 | 2.5 | | | 2.0 | | 1.0 | 2.0 |
| 41 | 41.6 | 80.0 | 1.0 | 4.0 | 2.0 | | 4.0 | | 4.0 | | 2.0 | 2.0 | | | |
| 42 | 40.2 | 80.0 | 1.0 | 4.0 | 2.0 | 1.0 | 3.5 | 1.0 | 3.5 | | | 2.0 | 2.0 | | |
| 43 | 38.7 | 80.0 | 2.0 | 4.0 | 2.0 | 1.0 | 3.0 | 1.0 | 3.0 | | | 2.0 | 2.0 | | |
| 44 | 37.4 | 80.0 | 2.0 | 4.0 | 2.0 | 2.0 | 3.0 | 1.0 | 3.0 | | | 1.0 | 2.0 | | |
| 45 | 37.6 | 80.0 | 2.0 | 4.0 | 2.0 | 2.0 | 3.0 | | 3.0 | | | 2.0 | 2.0 | | |
| 46 | 34.8 | 80.0 | 4.0 | 4.0 | 2.0 | 2.0 | 3.0 | | 3.0 | | | | 2.0 | | |
| 47 | 39.0 | 79.0 | 1.0 | 5.0 | 1.5 | | 5.0 | | 5.0 | | | 2.0 | 1.5 | | |
| 48 | 38.3 | 78.0 | 2.0 | 5.0 | 1.5 | | 5.0 | | 5.0 | | | 2.0 | 1.5 | | |
| 49 | 37.3 | 77.0 | 3.0 | 5.0 | 1.5 | | 5.0 | | 5.0 | | | 2.0 | 1.5 | | |
| 50 | 38.4 | 76.0 | 4.0 | 5.0 | 1.5 | | 5.0 | | 5.0 | | | 2.0 | 1.5 | | |
| 51 | 38.4 | 75.0 | 5.0 | 5.0 | 1.5 | | 5.0 | | 5.0 | | | 2.0 | 1.5 | | |
| 52 | | 80.0 | 4.0 | 1.0 | 1.5 | | 5.0 | | 5.0 | | | 2.0 | 1.5 | | |

Various melts prepared according to the present invention were tested for chemical resistance against water, acid and alkali. A 100 gram sample was crushed as specified by ASTM method procedure as reported in ASTM Designation C–225–65, Book of ASTM Standards, Part B, pages 223 to 228, 1965. A 10 gram sample of the crushed glass was placed into two separate flasks that have been previously aged with the attacking medium. Next, 50.0 milliliters of 0.2 normal sulfuric acid was introduced into the respective flasks. The stoppered flasks are then immersed in a constant temperature bath at 90° C. plus or minus 0.2° C. and retained there for four hours. After the flasks have cooled, 40 milliliters of the extract solution was taken for titration with 0.02 N $H_2SO_4$ to an excess of 1.0 ml. The solution was back-titrated with 0.02 N NaOH and the percentage of $Na_2O$ dissolved is calculated from the results of the titrations to give the effect of water as the attacking medium. A generally similar procedure is followed to measure the effect of an acid attacking medium.

The procedure for alkaline attack was the procedure reported in ASTM Special Technical Publication No. 342, pages 93 to 100, 1963. Briefly, the procedure consists in placing 1 gram of crushed glass in a platinum dish to which was added 25 ml. of 5% NaOH. The dish was covered and heated to 90° C. for 6 hours. After the alkaline attack, the solution was filtered, and the residue was ignited to a constant weight in a platinum crucible. The loss in weight was reported in milligrams.

Employing the procedures described supra, the chemical durability of a glass containing boron and $ZrO_2$ was compared with the chemical durability of a commercially-available glass containing boron but essentially free of $ZrO_2$. The results for these tests are reported in Table V.

TABLE V.—CHEMICAL DURABILITY OF GLASSES, MOLE PERCENT

|  | Example 53 | Example 54 | Example 55 |
| --- | --- | --- | --- |
| Components: |  |  |  |
| $SiO_2$ | 83.0 | 82.0 | 83.0 |
| $B_2O_3$ | 9.0 | 7.0 | 11.5 |
| $ZrO_2$ | 3.5 | 5.0 |  |
| $Na_2O$ | 4.5 | 5.0 | 4.1 |
| $Al_2O_3$ |  |  | 1.4 |
| Chemical durability $Na_2O$, percent dissolved: |  |  |  |
| Water attack | 0.0003 | 0.0015 | 0.001 |
| Acid attack | 0.017 | 0.007 | 0.006 |
| Alkali attack, mg./g | 34.7 | 17.5 | 72 |

The above reported test appears to demonstrate the unobvious properties that are obtained by the present invention. A desirable change in the durability of the glass was its increased resistance to attack by alkali. The attack on the subject glass was found to be as small as ½ of the attack on a borosilicate glass that was essentially free of zirconia. The most desirable glasses of the invention had a relatively low thermal coefficient of expansion of about 30 to $35 \times 10^{-7}$/° C., and a desired liquidus of about 1150 to 1200° C. The liquidus temperatures were at a viscosity of about log $\eta = 4$ to 4.5. The results obtained appear to indicate the unobvious and unexpected characteritsics for the novel glasses of the present invention.

The glass compositions of the present invention may be used for the manufacture of many items of commerce such as laboratory ware, serum bottles, transfusion bottles, ampuls, instrument glass and tubing, water gauges, glass piping, porous glass filters, beakers, pill jars, flasks, and the like.

While the illustrative embodiments of the invention have been described with particularity, it will be understood that various modifications will be apparent and can be readily made by those skilled in the art without departing from the scope and spirit of the invention.

We claim:
1. A glass composition possessing high chemical durability and being resistant to alkali wherein said glass composition consists essentially of 72 to 85 mole percent $SiO_2$, 4 to 12 mole percent $B_2O_3$, 1 to 6 mole percent $ZrO_2$, 2.5 to 7 mole percent $R_2O$ wherein R is a member selected from the group consisting of sodium, potassium and mixtures thereof, 0 to 3 mole percent $TiO_2$, 0 to 0.5 mole percent $Sb_2O_3$, and 0 to 4 mole percent $Al_2O_3$.

2. A glass composition according to claim 1 wherein said glass contains 80 to 85 mole percent $SiO_2$, 6 to 10 mole percent $B_2O_3$, 1.5 to 6 mole percent $ZrO_2$, 2.5 to 5 mole percent $Na_2O$, and 1 to 4 mole percent $Al_2O_3$.

3. A glass composition according to claim 1 wherein said glass composition consists essentially of 80 to 85 mole percent $SiO_2$, 6 to 10 mole percent $B_2O_3$, 1.5 to 6 mole percent $ZrO_2$, and 2.5 to 6 mole percent $Na_2O$.

4. A glass composition possessing high chemical durability and being resistant to alkali wherein said glass composition consists essentially of 72 to 85 mole percent $SiO_2$, 5 to 12 mole percent $B_2O_3$, 2.5 to 7 mole percent $R_2O$ wherein R is a member selected from the group consisting of sodium, potassium and mixtures thereof, 1 to 6 mole percent $ZrO_2$, 1 to 7.5 mole percent of a member selected from the group of CaO, BaO, SrO, MgO, and mixtures thereof, 0 to 4 mole percent $Al_2O_3$, 0 to 3 mole percent $TiO_2$, and 0 to 0.5 mole percent $Sb_2O_3$.

5. A glass composition according to claim 4 wherein said glass contains 80 to 85 mole percent $SiO_2$, 6 to 10 mole percent $B_2O_3$, 1.5 to 5 mole percent $ZrO_2$, 2.5 to 5 mole percent $Na_2O$, 1.5 to 4 mole percent $Al_2O_3$, and from 1 to 6 mole percent CaO.

6. A glass composition according to claim 4 wherein said glass contains 80 to 85 mole percent $SiO_2$, 6 to 10 mole percent $B_2O_3$, 1.5 to 5 mole percent $ZrO_2$, 2.5 to 5 mole percent $Na_2O$, 1.5 to 4 mole percent $Al_2O_3$, 1 to 6 mole percent CaO, and 1 to 6 mole percent MgO.

7. A glass composition according to claim 4 wherein said glass contains 80 to 85 mole percent $SiO_2$, 6 to 10 mole percent $B_2O_3$, 1.5 to 5 mole percent $ZrO_2$, 2.5 to 5 mole percent $Na_2O$, 1 to 4 mole percent $Al_2O_3$, 1 to 6 mole percent SaO, and 1 to 6 mole percent BaO.

8. A glass composition according to claim 4 wherein said glass contains 75 to 80 mole percent $SiO_2$, 6 to 10 mole percent $B_2O_3$, 1.5 to 5 mole percent $ZrO_2$, 2.5 to 5 mole percent $Na_2O$, 1 to 4 mole percent $Al_2O_3$, and 1 to 6 mole percent BaO.

9. A glass composition according to claim 4 wherein said glass contains 80 to 85 mole percent $SiO_2$, 6 to 10 mole percent $B_2O_3$, 1.5 to 5 mole percent $ZrO_2$, 2 to 3 mole percent $Na_2O$, 1 to 4 mole percent $Al_2O_3$, 1 to 6 mole percent CaO, and 1 to 6 mole percent BaO.

10. A glass composition possessing high chemical durability and being resistant to alkali wherein said glass composition consists essentially of 72 to 85 mole percent $SiO_2$, 1 to 5 mole percent $ZrO_2$, 1 to 6 mole percent of a member selected from the group consisting of $Na_2O$, $K_2O$, and mixtures thereof, 6 to 15 mole percent of a member selected from the group consisting of CaO, MgO, SrO, BaO, and mixtures thereof, 0 to 3 mole percent $Al_2O_3$, 0 to 2 mole percent ZnO, and 0 to 1 mole percent $Li_2O$, and 1 to 5 mole percent $B_2O_3$.

11. A glass composition according to claim 10 wherein said glass contains 80 to 85 mole percent $SiO_2$, 1 to 5 mole percent $ZrO_2$, 1 to 5 mole percent $B_2O_3$, 2 to 5 mole percent $Na_2O$, 6 to 7.5 mole percent CaO, and 6 to 7.5 mole percent MgO.

12. A glass composition according to claim 10 wherein said glass contains 80 to 85 mole percent $SiO_2$, 1 to 5 mole percent $ZrO_2$, 1 to 5 mole percent $B_2O_3$, 2 to 6 mole percent $Na_2O$, and 6 to 12 mole percent CaO.

13. A glass composition possessing high chemical durability and being resistant to alkali wherein said glass composition consists essentially of 80 to 85 mole percent $SiO_2$, 0 to 3 mole percent $Al_2O_3$, 1 to 5 mole percent $ZrO_2$, 1 to 5 mole percent $B_2O_3$, 0 to 6 mole percent $Na_2O$, $K_2O$, or mixtures thereof, and wherein the total $Na_2O+K_2O$ is at least 2 mole percent, and 0 to 15 mole percent CaO, MgO, SrO, or BaO, and wherein the total $CaO+MgO+SrO+BaO$ is at least 6 to 15 mole percent.

14. A glass composition according to claim 13 wherein said glass contains 1 to 2 mole percent $Al_2O_3$.

References Cited

UNITED STATES PATENTS

| | | | |
|---|---|---|---|
| Re 23,049 | 11/1948 | Armistead | 106—54 |
| 3,203,815 | 8/1965 | Michael | 106—49 |
| 3,275,492 | 9/1966 | Herbert. | |
| 2,844,693 | 7/1958 | Rigterink | 106—49 |

HELEN M. McCARTHY, Primary Examiner